US011708766B2

(12) United States Patent
Angel et al.

(10) Patent No.: US 11,708,766 B2
(45) Date of Patent: Jul. 25, 2023

(54) INTERCOOLED CASCADE CYCLE WASTE HEAT RECOVERY SYSTEM

(71) Applicant: Industrom Power LLC, Houston, TX (US)

(72) Inventors: Paul Angel, Huffman, TX (US); Joseph Harris, Houston, TX (US)

(73) Assignee: Industrom Power LLC, Houston, TX (US)

( * ) Notice: Subject to any disclaimer, the term of this patent is extended or adjusted under 35 U.S.C. 154(b) by 0 days.

(21) Appl. No.: 17/430,398

(22) PCT Filed: Mar. 5, 2020

(86) PCT No.: PCT/US2020/021265
§ 371 (c)(1),
(2) Date: Aug. 12, 2021

(87) PCT Pub. No.: WO2020/181137
PCT Pub. Date: Sep. 10, 2020

(65) Prior Publication Data
US 2022/0178268 A1 Jun. 9, 2022

Related U.S. Application Data

(60) Provisional application No. 62/814,827, filed on Mar. 6, 2019.

(51) Int. Cl.
*F01D 13/00* (2006.01)
*F01K 7/32* (2006.01)
(Continued)

(52) U.S. Cl.
CPC ............. *F01D 13/00* (2013.01); *F01D 15/08* (2013.01); *F01D 15/10* (2013.01); *F01D 15/12* (2013.01);
(Continued)

(58) Field of Classification Search
CPC .. F01K 7/32; F01K 25/103; F02C 1/04; F02C 1/05; F02C 1/10; F02C 1/105;
(Continued)

(56) References Cited

U.S. PATENT DOCUMENTS 2,633,705 A 4/1953 Hawkins
4,557,664 A 12/1985 Tuttle et al.
(Continued)

FOREIGN PATENT DOCUMENTS

CN 108223031 A * 6/2018
JP 2012172587 A 9/2012

OTHER PUBLICATIONS

International Preliminary Report on Patentability dated Sep. 16, 2021 (issued in PCT Application No. PCT/US20/21265) [7 Pages].
(Continued)

*Primary Examiner* — Mark A Laurenzi
*Assistant Examiner* — Xiaoting Hu
(74) *Attorney, Agent, or Firm* — Michael S. McCoy; Amatong McCoy LLC

(57) ABSTRACT

Provided herein is a power generation system and method for transforming thermal energy, such as waste heat, into mechanical energy and/or electrical energy. The system employs features designed to accelerate start times, reduce size, lower cost, and be more environmentally friendly. Tire system may include multiple compressors on separate pinion shafts with multiple expanders, a temperature valve upstream of compressors with a mass management system downstream, an intercooler between compressors, and a cascade exchanger. In one embodiment, the system is configured to drive a synchronous generator, with the separate pinion shafts rotating at two separate, but constant, speeds.

20 Claims, 3 Drawing Sheets

(51) Int. Cl.
*F01K 25/10* (2006.01)
*F02C 1/04* (2006.01)
*F01D 15/08* (2006.01)
*F01D 15/10* (2006.01)
*F01D 15/12* (2006.01)

(52) U.S. Cl.
CPC .............. *F01K 7/32* (2013.01); *F01K 25/103* (2013.01); *F02C 1/04* (2013.01)

(58) Field of Classification Search
CPC ........ F01D 13/00; F01D 13/003; F01D 15/08; F01D 15/10; F01D 15/12; F04D 13/04; F04D 13/12; F04D 13/14; F04D 25/04; F04D 25/16; F04D 25/163
See application file for complete search history.

(56) References Cited

U.S. PATENT DOCUMENTS

| | | | |
|---|---|---|---|
| 5,960,625 A | 10/1999 | Zdvorak | |
| 6,230,480 B1 | 5/2001 | Rollins, III | |
| 6,751,959 B1 | 6/2004 | McClanahan et al. | |
| 8,459,029 B2 | 6/2013 | Lehar | |
| 8,490,397 B2 | 7/2013 | Lehar | |
| 8,596,075 B2 | 12/2013 | Allam et al. | |
| 8,613,195 B2 | 12/2013 | Held et al. | |
| 8,616,001 B2 | 12/2013 | Held et al. | |
| 8,616,323 B1 | 12/2013 | Gurin | |
| 8,646,272 B2 | 2/2014 | Baik et al. | |
| 8,783,034 B2 | 7/2014 | Held | |
| 8,794,002 B2 | 8/2014 | Held et al. | |
| 8,813,497 B2 | 8/2014 | Hart et al. | |
| 8,857,186 B2 | 10/2014 | Held | |
| 8,869,531 B2 | 10/2014 | Held | |
| 8,966,901 B2 | 3/2015 | Held et al. | |
| 9,062,898 B2 | 6/2015 | Held et al. | |
| 9,083,212 B2 | 7/2015 | Fairman et al. | |
| 9,091,278 B2 | 7/2015 | Vermeersch | |
| 9,115,605 B2 | 8/2015 | Held et al. | |
| 9,118,226 B2 | 8/2015 | Kacludis et al. | |
| 9,249,691 B2 | 2/2016 | Ast et al. | |
| 9,249,728 B2 | 2/2016 | Lim et al. | |
| 9,284,855 B2 | 3/2016 | Held et al. | |
| 9,341,084 B2 | 5/2016 | Xie et al. | |
| 9,359,919 B1 | 6/2016 | Berry | |
| 9,388,817 B1 | 7/2016 | Wright et al. | |
| 9,458,738 B2 | 10/2016 | Held et al. | |
| 9,476,428 B2 | 10/2016 | Agrawal et al. | |
| 9,574,570 B2 | 2/2017 | Lillis | |
| 9,638,065 B2 | 5/2017 | Vermeersch et al. | |
| 9,677,432 B2 | 6/2017 | Kang et al. | |
| 9,752,460 B2 | 9/2017 | Bowan | |
| 9,752,672 B2 | 9/2017 | Aschenbruck et al. | |
| 9,797,314 B2 | 10/2017 | Hillel et al. | |
| 9,845,807 B2 | 12/2017 | Takeda et al. | |
| 9,863,282 B2 | 1/2018 | Hart et al. | |
| 10,012,448 B2* | 7/2018 | Laughlin | F01K 3/20 |
| 10,060,300 B2 | 8/2018 | Bastnagel et al. | |
| 10,101,092 B2 | 10/2018 | Stapp et al. | |
| 2012/0047892 A1* | 3/2012 | Held | F01K 7/08 60/660 |
| 2012/0107094 A1 | 5/2012 | Lillis | |
| 2012/0131921 A1 | 5/2012 | Held | |
| 2013/0001948 A1 | 1/2013 | Lim et al. | |
| 2013/0033037 A1 | 2/2013 | Held et al. | |
| 2013/0033044 A1 | 2/2013 | Wright et al. | |
| 2013/0036736 A1* | 2/2013 | Hart | F01K 3/185 60/645 |
| 2013/0152576 A1 | 6/2013 | Mavuri et al. | |
| 2014/0088773 A1* | 3/2014 | Davidson | H02K 7/18 700/288 |
| 2014/0103661 A1* | 4/2014 | Kacludis | F02C 1/04 290/54 |
| 2015/0037136 A1 | 2/2015 | Fairman et al. | |
| 2015/0139776 A1 | 5/2015 | Takeda et al. | |
| 2015/0322811 A1 | 11/2015 | Fairman et al. | |
| 2016/0003108 A1* | 1/2016 | Held | F01K 25/103 60/517 |
| 2016/0010512 A1* | 1/2016 | Close | F01K 25/103 60/671 |
| 2016/0017758 A1* | 1/2016 | Vermeersch | F01K 13/02 60/646 |
| 2016/0040557 A1* | 2/2016 | Vermeersch | F01K 25/103 60/670 |
| 2016/0326916 A1* | 11/2016 | Roh | F01K 25/103 |
| 2017/0234266 A1* | 8/2017 | Hwang | F01K 25/103 60/645 |
| 2017/0254229 A1* | 9/2017 | Fletcher | F02C 1/105 |
| 2018/0179917 A1* | 6/2018 | Apte | F01K 7/38 |
| 2018/0187595 A1* | 7/2018 | Apte | F02C 9/24 |
| 2018/0187627 A1* | 7/2018 | Apte | B01D 53/265 |
| 2018/0283222 A1* | 10/2018 | Park | F01K 7/165 |
| 2019/0024540 A1 | 1/2019 | Cha | |
| 2019/0162083 A1 | 5/2019 | Wygant | |
| 2020/0102895 A1* | 4/2020 | Fetvedt | F01D 15/10 |
| 2020/0200049 A1* | 6/2020 | Ryu | F02B 37/12 |

OTHER PUBLICATIONS

International Search Report and Written Opinion dated Aug. 19, 2020 (issued in PCT Application No. PCT/US20/21265) [10 Pages].
Partial European Search Report dated Nov. 18, 2022 (issued in EP Application No. 20 767 439.1) [12 pages].
Modern Power Systems (2018). "Supercritical CO2 and the flexible future of fossil fuels." [5 pages].
Dostal, V. et al. (2004). "A Supercritical Carbon Dioxide Cycle for Next Generation Nuclear Reactors". Advanced Nuclear Power Technology Program. [326 pages].
EChogen Power Systems (2017). EchogenEPS100 Heat Recovery System—Marketing Brochure. OH. [2 pages].
Eisemann, Kevin M., & Fuller, Robert L. (2011). Supercritical CO2 Brayton Cycle Design and System Start-Up Options Boulder, Colorado.[7 pages].
Engineering ToolBox (2003). Critical Temperatures and Pressures for some Common Substances. [10 pages].
Held, Timothy J. (2015) "Supercritical CO2 Cycles for Gas Turbine Combined Cycle Power Plants" Power Gen International. Nevada. [20 pages].
Hoopes, Kevin, et al. (2018). "Advanced Gas Turbine and sCO2 Combined Cycle Power System". UTSR Meeting. [18 pages].
Huck, Pierre, et al. (2016). "Performance comparison of supercritical CO2 versus steam bottoming cycles for gas turbine combined cycle applications." The 5th International Symposium—Supercritical CO2 Power Cycles. Texas [14 pages].
Moore, Jeff (2018). "Development of a High-Efficiency Hot Gas Turbo-expander and Low-Cost Heat Exchangers for Optimized CSP Supercritical CO2 Operation." Southwest Research Institute San Antonio, TX [181 pages].
Moroz, Leonid, et al. (2015). "Evaluation of Gas Turbine Exhaust Heat Recovery Utilizing Composite Supercritical CO2 Cycle". Proceedings of International Gas Turbine Congress 2015 Tokyo, p. 109-115.
Murphy, Caitlin, et al. (2019). "NREL—The Potential Role of Concentrating Solar Power within the Context of DOE's 2030 Solar Cost Targets". National Renewable Energy Laboratory. CO. [137 pages].
Robb, Drew. (2012). Supercritical CO2—The Next Big Step?. MJH Life Science and Turbomachinery Magazine. [8 pages].
U.S. Department of Energy (2012). "SunShot Vision Study" Report. [320 pages].
Wright, Steven A. et al. (2011). "Supercritical CO2 Power Cycle Development Summary at Sandia National Laboratories". Sandia National Laboratories Advanced Nuclear Technology [29 pages].
Wright, Steven A., et al. "Thermo-Economic Analysis of Four sCO2 Waste Heat Recovery Power Systems". WA. [16 pages].

* cited by examiner

INTERCOOLED CASCADE CYCLE WASTE HEAT RECOVERY SYSTEM

CROSS-REFERENCE TO RELATED APPLICATIONS

The present application is a National Stage Entry of PCT Application No. PCT/US2020/021265, filed on Mar. 5, 2020 (pending), which claims priority to U.S. provisional application Ser. No. 62/814,827, which was filed on Mar. 6, 2019, and entitled "Intercooled Cascade Cycle Waste Heat Recovery System", the entireties of which are incorporated herein by reference.

TECHNICAL FIELD

This invention generally relates to systems and methods for waste heat recovery and power generation systems using high pressure working fluids such as supercritical carbon dioxide.

BACKGROUND OF THE INVENTION

Many methods and systems exist for generating electricity by the transfer and conversion of heat into mechanical or electrical energy. Systems where the hot source fluid is not recycled, but rather, is discarded or removed by external means are known as waste heat sources. Methods exist for utilizing this waste heat in a separate system or cycle to generate additional mechanical work or electrical energy (known as waste heat recovery systems), however these waste heat recovery systems typically have a higher cost per unit of power produced (referred to in the industry as specific cost) and a larger system volume per unit power produced (referred to as specific volume) than systems utilizing non-waste heat sources. They also suffer from a lengthy time of response to initial thermal input into the system. This is due to phase change of the working fluid in the system heat exchangers as well as the volume and mass of the heat exchangers per unit of power produced. Waste heat recovery systems have additional limitations.

Conventional waste heat recovery systems for power generation generally use water or an organic hydrocarbon as a working fluid. These systems were designed and developed to optimize cycle efficiency and power output. A Rankine power cycle is used and the usual waste heat temperature range falls between 300 and 900 degrees C. Conventional waste heat recovery systems are also commonly large-scale, stationary, and costly. Where water is used as a working fluid, chemical treatment is required. Organic hydrocarbons, as an alternative, are not environmentally friendly. Moreover, conventional waste heat recovery systems require a significant amount of time to start—usually 60 minutes, or more. A need therefore exists for a waste heat recovery power system that is compact, mobile, fast starting, lower cost, environmentally friendly, and that can be used with lower temperature sources.

Disclosed herein is a novel power system that uses compact equipment, replaceable components, and takes advantage of high-density or supercritical working fluid. This power system is optimized for lower cost, faster starting, cleaner and more environmentally friendly working fluid, and a more compact size that is capable of being mounted on trailer(s) for mobility.

BRIEF SUMMARY OF THE INVENTION

According to one aspect of the present disclosure, there are provided methods and apparatus to improve high-density working fluid system design, thereby optimizing efficiency, reducing size, lowering cost, and improving start times, among other benefits. The design presented herein is well suited to operate with supercritical working fluids having critical temperatures below 200 degrees Celsius.

According to one embodiment, there is provided a supercritical Brayton cycle power generation system comprising at least one compressor for compressing working fluid, at least one expander for generating work, at least one primary heat exchanger for adding heat to the power generation system, at least one temperature control valve located upstream of the at least one compressor, a mass management system located downstream of the at least one compressor, the mass management system comprising a pressure control valve for adding mass to the power generation system and a backpressure control valve for removing mass from the power generation system, wherein the at least one temperature valve is configured to maintain working fluid outside of a liquid state.

In another embodiment, the system previously described further comprises at least one primary cooler for rejecting heat from the working fluid, wherein the at least one primary cooler is located upstream of the at least one temperature control valve, at least one stall margin control valve configured to control the stall margin of the at least one compressor, at least one bypass valve configured to redirect the working fluid around the at least one expander.

In another embodiment of the first described system, it further comprises at least one waste heat flow modulating valve configured to modulate the working fluid flow through the primary heat exchanger. The expander(s) described above could be axial flow turbine. In one embodiment, the working fluid of the system herein described is supercritical carbon dioxide. The system may also comprise a pinion shaft, wherein the at least one expander is mechanically rotationally connected to the at least one compressor through the pinion shaft.

According to another embodiment disclosed herein, there is provided a supercritical Brayton cycle power generation system comprising a first compressor for compressing working fluid, a second compressor for compressing working fluid, an inter-stage cooler, wherein the inter-stage cooler is positioned downstream of the first compressor and upstream of the second compressor such that working fluid is cooled by way of the inter-stage cooler prior to the inlet of the second compressor; and a primary expander for generating work, a cascade expander for generating work, and a cascade heat exchanger positioned downstream of the primary expander and upstream of the cascade expander such that excess heat from the primary expander is transferred to the working fluid entering the cascade expander.

In one embodiment, the previously disclosed system further comprises at least one temperature control valve located upstream of the first compressor, at least one temperature control valve located upstream of the second compressor, a mass management system located downstream of the first and second compressor, the mass management system comprising a pressure control valve for adding mass to the power generation system and a backpressure control valve for removing mass from the power generation system, and at least one stall margin control valve located downstream of the first and second compressor, configured to control the stall margin of the first and second compressor.

In one embodiment, that system further comprises at least one waste heat flow modulating valve configured to modulate the working fluid flow through the primary heat exchanger, and at least one bypass valve configured to redirect the working fluid around the primary and cascade expander. In another embodiment, the at least one bypass valve is configured to redirect the working fluid around either the primary or cascade expander only.

In one embodiment, the system further comprises a first pinion shaft mechanically rotationally connecting the cascade expander to the first compressor, and a second pinion shaft mechanically rotationally connecting the primary expander to the second compressor. In another embodiment of the just disclosed system, the cascade expander and first compressor have a first rotational speed, and the primary expander and second compressor have a second rotational speed, and the first rotational speed is different than the second rotational speed.

In one embodiment, the first pinion shaft and the second pinion shaft are connected through a bull gear. As disclosed above, the system may have a number of different types and states of working fluids. In one embodiment, the working fluid has a critical temperature less than 200 degrees Celsius. In another, the working fluid is supercritical carbon dioxide. In one embodiment, the system further comprising a bypass valve configured to redirect the working fluid around the primary and cascade expander, wherein the system is configured to be started up by rotation of the generator while the bypass valve is closed.

The power generation system of the present invention includes a number of novel features designed to interact with a synchronous generator. There is disclosed a supercritical Brayton cycle power generation system comprising a cascade expander mechanically rotationally connected to a first compressor through a first pinion shaft, a primary expander mechanically rotationally connected to a second compressor through a second pinion shaft, wherein the first pinion shaft and second pinion shaft are mechanically rotationally connected through a gear, and a generator mechanically rotationally connected to the first and second pinion shafts. In one embodiment, the generator is a synchronous generator.

In another embodiment, during steady state operations, the cascade expander and first compressor rotate at a first speed, the primary expander and second compressor rotate at a second speed, the generator rotates at a third speed, and wherein all three speeds are constant. The system may have primary and cascade expanders that are axial turbines. In one embodiment, each turbine has a working fluid inlet location and an outlet location, and the inlet location is distanced farther from the gear than the outlet location. In another embodiment, the system further comprises a working fluid having a critical temperature less than 200 degrees Celsius. In another embodiment, the working fluid is supercritical carbon dioxide.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF THE INVENTION

Figure 1:
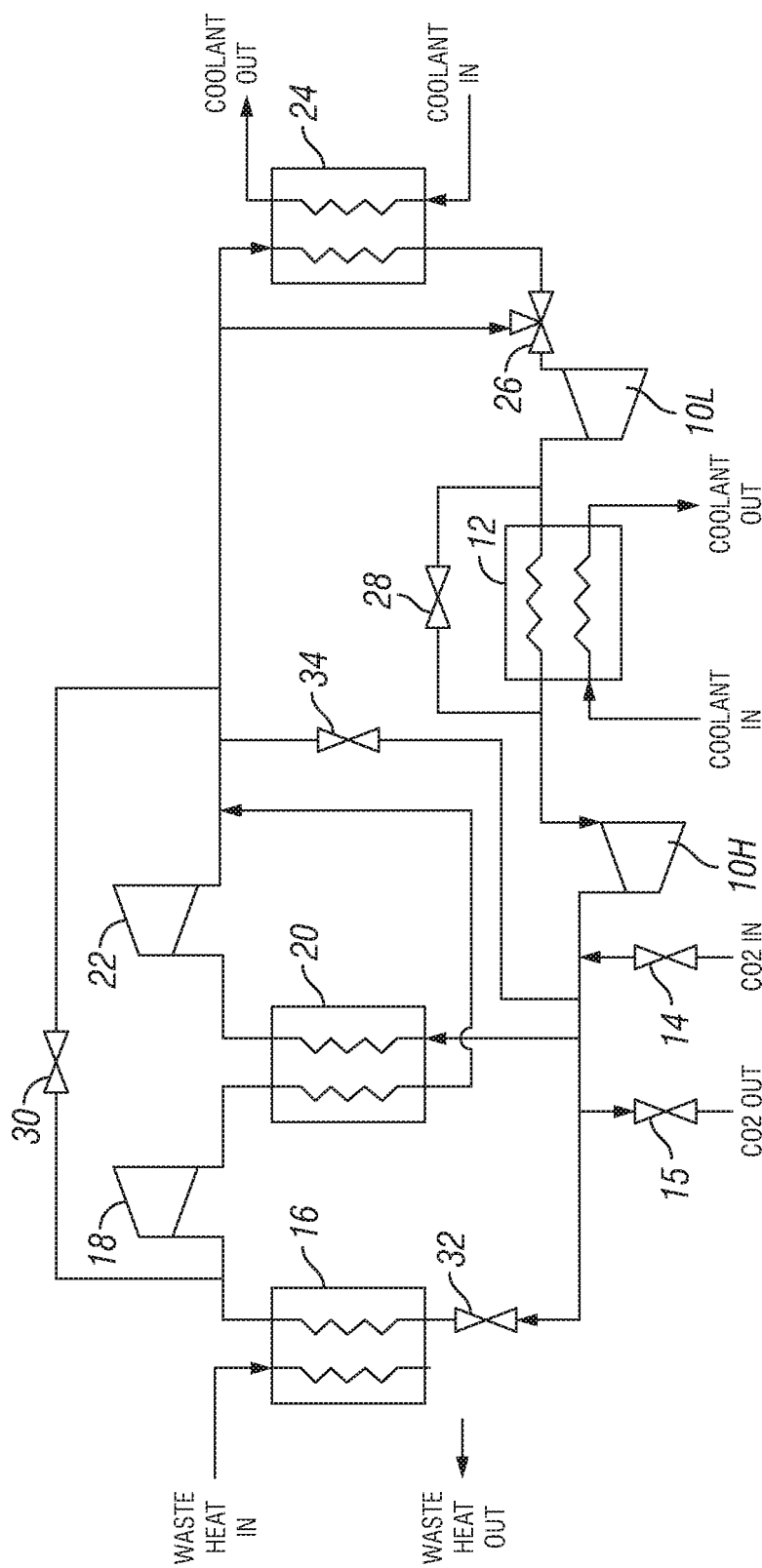
FIG. 1: Schematic Representation of Fluid Containing Components in The Cycle

As used herein, "a" and "an" means one or more than one unless otherwise stated. As it is used in the claims or specification, the term "or" is intended to encompass both exclusive and inclusive cases. In other words, "A or B" is intended to be synonymous with "at least one of A and B," unless otherwise expressly specified herein.

The power generation cycle disclosed herein uses a working fluid in piping. Directions of fluid flow through said piping during steady state operations of the power cycle are indicated by arrow in the figures herein provided. One of ordinary skill in the art of power systems would understand the direction even without said arrows as moving from regions of higher pressure to regions of lower pressure. A person of skill in the art would also understand the meaning of upstream and downstream.

Presented herein is a power generation system using high-density working fluid, such as supercritical carbon dioxide. This system is adapted to overcome issues with conventional power generation systems, especially with regard to waste heat recovery. Specifically, this system has been optimized to minimize cost (for example, cost per unit power output), reduce system start times, improve mobility, and present cleaner options, all the while maintaining acceptable power and efficiency profiles. According to the disclosed embodiment presented herein, this system utilizes a Brayton cycle having working fluid maintained in a supercritical state. The system designs described herein employ several features that allow for increased power generation capabilities in power generation systems of smaller size, such as between 10 and 50 megawatts of net power. The term net power is the actual power delivered, for example, for consumer use. In one example, that use would be the electrical grid.

A practitioner skilled in the art of power generation would appreciate the novel features of the embodiments herein disclosed, in view of the needs to be solved. For example, as will be presented below, the power generation system may include an inter-stage cooler between a high-pressure and low-pressure compressor, which in combination with a cascade heat exchanger, allows for a smaller overall system size and, consequently, faster cold start times because heat exchangers take less time to achieve optimum operating temperatures. By controlling mass flow through the system by way of a temperature valve in front of the system compressors, rather than a pressure valve for example, and by injecting mass after the compressors, the pressure ratio of the system expanders is being increased rather than decreased, which also speeds start time because the system benefits from flow through the expander that does have to be first compressed. This reduces the load on the generator at startup. Synchronizing the speed of the components in the system, as will be disclosed in another embodiment described herein, also speeds start time because component speeds and temperatures are continuously and simultaneously increased until the speeds and temperatures reach steady state levels rather than being started in a piecewise fashion with hold-states (periodic pauses to allow a component to heat up and reach thermal equilibrium to reduce thermal stresses). In addition, it lowers costs because expensive electrical equipment associated with an asynchronous generator are not needed.

According to the embodiments disclosed herein, the disclosed power generation system is capable of starting in times of 10 to 15 minutes, rather than the 60+ minutes of conventional waste heat power generation systems. In addition, the system is compact enough to be transported as pre-assembled modules either integrated in standard shipping containers or integrated with axles and chassis for legal over the road transportation.

Description of the System Assembly

Figure 2:
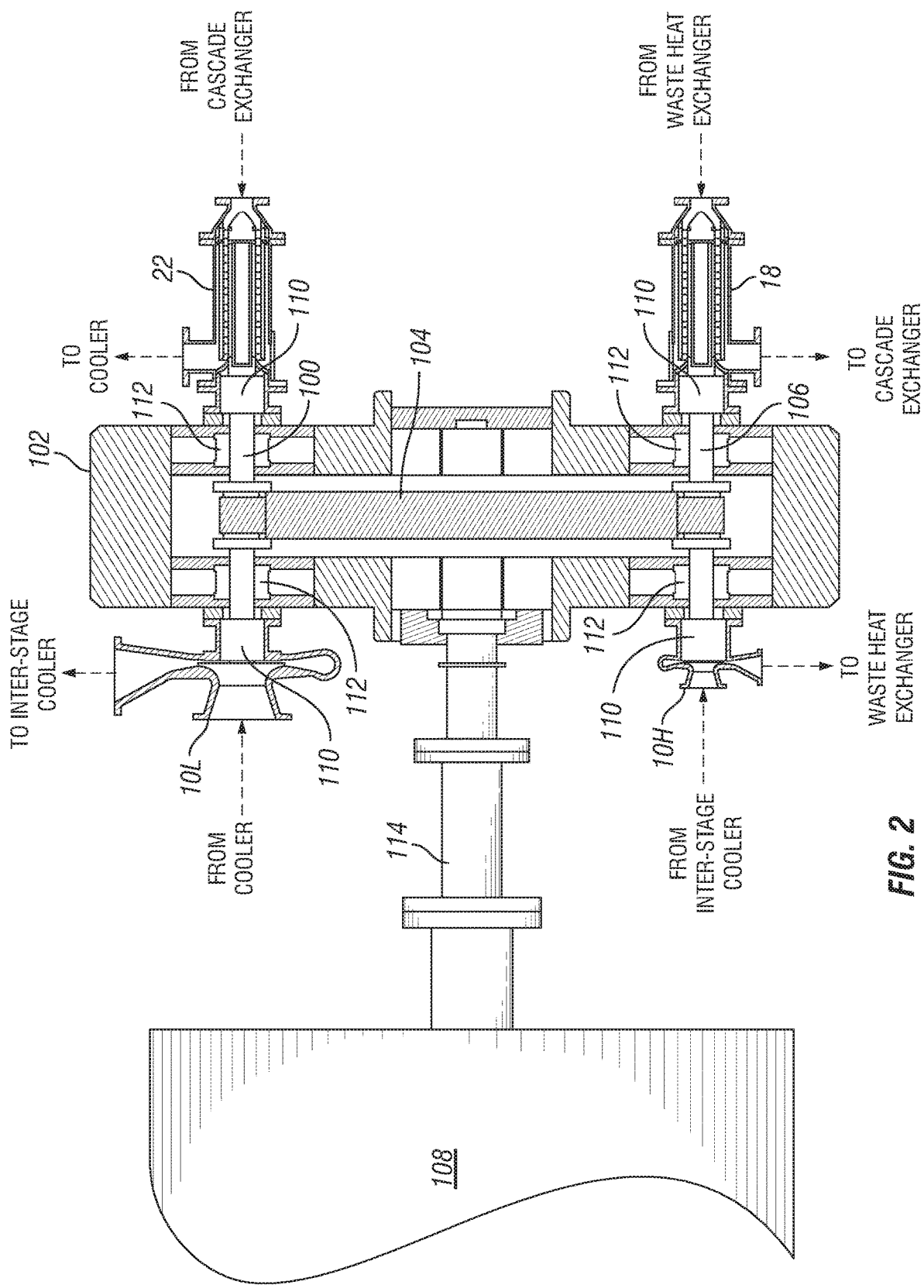
FIG. 2: Plan View of The Rotating Machinery of The Cycle

The following description of the system assembly is an exemplary embodiment encompassing the aforementioned features and benefits. A practitioner skilled in the art will appreciate the power generation system, as illustrated in FIG. 1 and FIG. 2, and the subsequent description of its operation at steady-state conditions. FIG. 1 is a representation of fluid containing components of an exemplary embodiment of the present invention. FIG. 2 is a representation of the rotating machinery of an exemplary embodiment of the present invention.

A low-pressure compressor 10L having both a working fluid inlet and outlet and an internal rotational element has the working fluid outlet fluidly connected to a working fluid inlet of an inter-stage cooler 12 (also known as intercooler 12) and is rotationally connected to a cascade expander 22 by way of a low speed pinion shaft 100. Inter-stage cooler 12 has both a working fluid inlet and outlet and a cooling fluid inlet and outlet and is fluidly connected by piping or ducting to a high-pressure compressor 10H. Intercooler 12 may be a counter flow exchanger, as shown in FIG. 1. High pressure compressor 10H is rotationally connected to a primary expander 18 by high speed pinion shaft 106 and fluidly connected by ducting or piping to an inlet of a waste heat exchanger 16, which is also fluidly connected to a waste heat source (not shown) by way of ducting or piping, and to an inlet of primary expander 18. An outlet of primary expander 18 is fluidly connected to an inlet of a cascade heat exchanger 20, which is also fluidly connected to both the outlet of the high-pressure compressor 10H and an inlet of a cascade expander 22. Compressors compress working fluid, and may be positive displacement type such as piston or screw compressors or dynamic type such as axial or centrifugal compressors. Expanders generate work, and may be of the positive displacement type such as piston or screw expanders or dynamic type such as axial or radial turbines.

An outlet of cascade expander 22 and the working fluid outlet of cascade heat exchanger 20 are fluidly connected to a working fluid inlet of a cooler 24, which also has cooling fluid inlet and outlet connections by which it is connected to a cooling source (not shown). A temperature control valve 26 is provided upstream of low-pressure compressor 10L, which has two inlets—one connecting the ducting or piping at the outlet of the cascade expander 22 the other inlet connected to the outlet of the cooler 24. An inter-stage temperature control valve 28 is connected between the outlet of the low-pressure compressor 10L and the inlet of high-pressure compressor 10H such that a parallel path to inter-stage cooler 12 is formed. As will be made apparent in discussion of the system operation, inter-stage temperature control valve 28 may be a two-way or three-way valve. A pressure control valve 14 and a backpressure control valve 15 fluidly connect the outlet of the high-pressure compressor 10H to a CO2 source (not shown). A compressor stall margin control valve 34 fluidly connects the outlet of high-pressure compressor 10H and the inlet to the cooler 24. A primary expander bypass valve 30 fluidly connects the outlet of waste heat exchanger 16 with the inlet of the cooler 24, thereby bypassing expanders 18 and 22, as shown in FIG. 1. In an alternative embodiment, bypass control valve 30 may be fluidly connected to bypass only primary expander 18 or only cascade expander 22. Returning to FIG. 1, a waste heat exchanger flow modulating valve 32 is located in the piping connecting the outlet of the high-pressure compressor 10H with the working fluid inlet to the waste heat exchanger 16.

In the embodiment shown in FIG. 2, primary expander 18, cascade expander 22, low pressure compressor 10L, and high-pressure compressor 10H are mounted to the structure of a gearbox 102. A bull gear 104 between low-speed pinion shaft 100 and high-speed pinion shaft 106 rotationally connects primary expander 18 and cascade expander 22 to a generator 108 by way of a coupling 114. One of ordinary skill in the art would recognize various devices/methods known in the industry for rotationally connecting two or more shafts, including but not limited to gears, belts, frictional components, fluid connections. A seal 110 and bearing 112 are mounted inboard of primary expander 18 and high-pressure compressor 10H on high-speed shaft 106 and inboard of cascade expander 22 and low-pressure compressor 10L on low speed pinion shaft 100. Flexible coupling 114 transmits torque from bull gear 104 to generator 108, while permitting lateral, angular, and phase misalignment of bull gear 104 and generator 108.

Operation of the Disclosed System

Embodiments of the disclosure herein may provide an exemplary heat engine for recovering waste heat energy. Further, the system is well suited for fast cold start times, low cost, and mobility. One of skill in the art will appreciate the design herein disclosed, in view of the aforementioned. An exemplary embodiment is configured to operate on a Brayton cycle. Still another exemplary embodiment utilizes working fluid in a supercritical state. In a preferred embodiment, the working fluid remains in a supercritical state throughout the entire cycle. In one embodiment, the working fluid is supercritical carbon dioxide.

Figure 3:
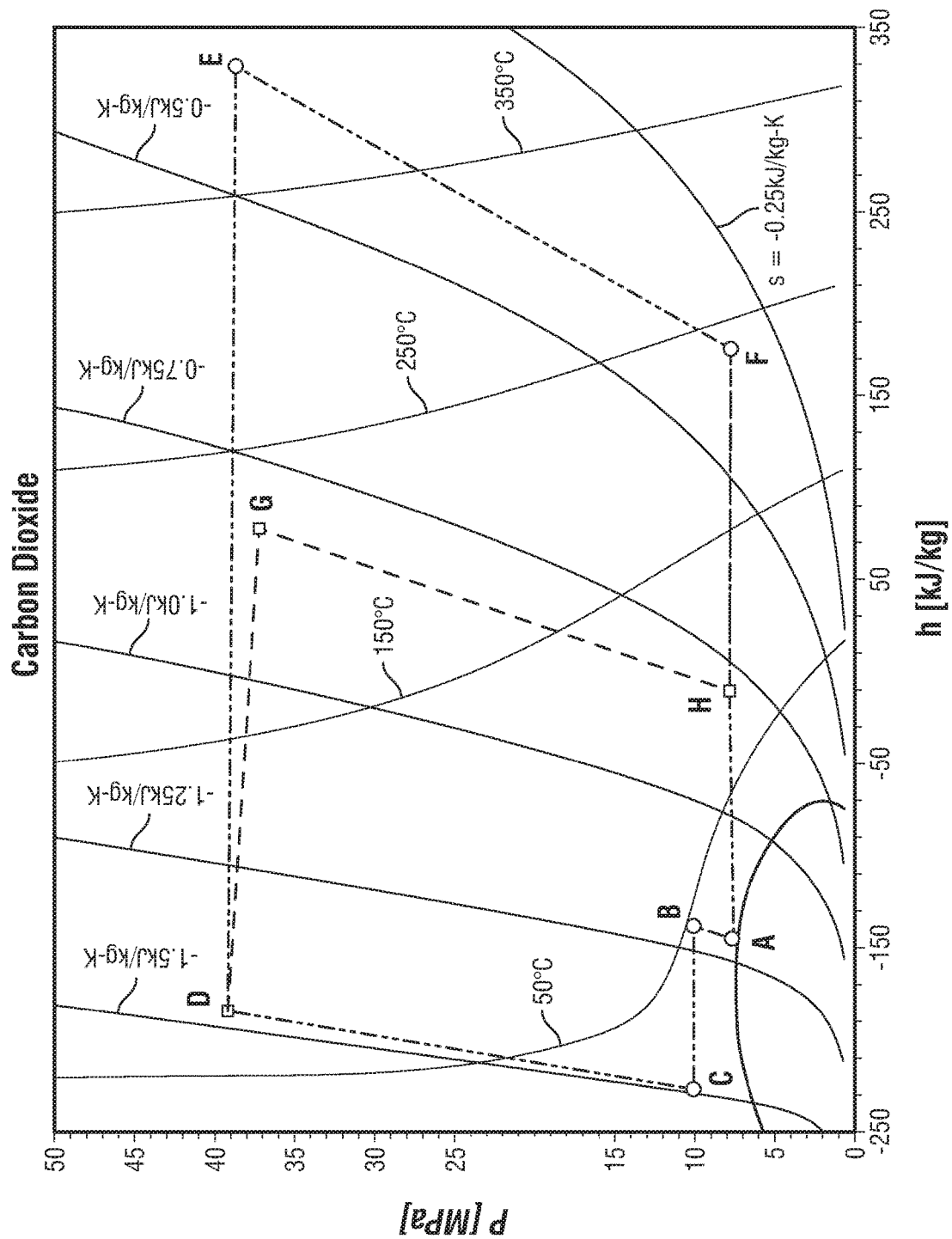
FIG. 3: State Diagram Showing the Pressure and Enthalpy of The Fluid at Different States Within the Cycle

The embodiment shown in FIG. 1 and FIG. 2 will identify novel features of the present design. FIG. 3 represents a state diagram showing the pressure and enthalpy of a working fluid at different states within the cycle, where the working fluid in the circuit is maintained in a supercritical state. In one embodiment, the working fluid is supercritical carbon dioxide. One of ordinary skill in the art would recognize that the state diagram of FIG. 3 is representative, but actual pressures and enthalpy may vary.

As would be appreciated, the rotational element of low-pressure compressor 10L converts rotation energy into fluid enthalpy, thereby pressurizing the working fluid to a pressure P1 and temperature T1 represented by state B on FIG. 3, and causing the working fluid to circulate through the working fluid circuit. Working fluid then enters inter-stage cooler 12, where its temperature is reduced to T2 by transference of thermal energy from the cooling fluid. This is represented by state C in FIG. 3. Reduction of working fluid temperature increases its density, thereby reducing the work required to further pressurize the working fluid (via high-pressure compressor 10H) to pressure P2, represented by state D on FIG. 3, where the pressure P2 is greater than P1.

Working fluid at pressure P2 is then split into two fluid streams M1 and M2. Fluid stream M1 enters waste heat exchanger 16 where waste heat exchanger 16 transfers thermal energy from a waste heat source to working fluid stream M1, heating it to a temperature T3 shown as state E on FIG. 3. Working fluid stream M1 then enters primary expander 18 where the pressure and temperature of the working fluid are reduced to state F and the change in enthalpy of the fluid is transformed into rotational energy, which rotates high pressure compressor 10H by way of high-speed pinion shaft 106. Through meshing of the gear teeth of high-speed pinion shaft 106 and bull gear 104, this also causes bull gear 104 to rotate, which transmits torque through coupling 114 to perform work, such as by way of generator 108, which in this embodiment, converts rotational energy into electrical energy.

Working fluid stream M1 exits primary expander at state F and enters cascade heat exchanger 20 where thermal energy is transferred from working fluid stream M1 to working fluid stream M2, which enters at the lower temperature state D and is heated to state G at the high pressure outlet of cascade heat exchanger 20. Working fluid stream M2 then enters cascade expander 22 where the pressure and temperature of working fluid M2 are reduced to state H and the change in enthalpy of the fluid is transformed into rotation energy which rotates low-pressure compressor 10L by way of low speed pinion shaft 100 and, through meshing of the gear teeth of low speed pinion shaft 100 and bull gear 104, adds to the torque transmitted to generator 108 by high-speed shaft 106.

Working fluid streams M1 and M2 then combine downstream of the cascade heat exchanger 20 and cascade expander 22. The combined working fluid stream M3 then enters cooler 24 where the thermal energy of working fluid stream M3 is transferred to a cooling fluid, thereby reducing the temperature of the working fluid stream M3 to state A and increasing the temperature of the cooling fluid stream. Working fluid stream M3 then enters low-pressure compressor 10L to repeat the working fluid circuit.

Turning back to FIG. 2, shaft seals 110 reduce working fluid leakage while permitting shaft rotation from the rotational fluid components: the low-pressure compressor 10L, the high-pressure compressor 10H, the primary expander 18, and the cascade expander 22. Bearings 112 align the rotating elements of the rotational fluid components within the respective pressure containment structures and transmit radial and axial loads from low-speed pinion 100 and high-speed pinion 106 to the structural support of gearbox 102 while permitting shaft rotation.

The cycle disclosed herein is, according to embodiments presented, configured to operate with supercritical working fluids having critical temperatures below 200 degrees Celsius. Examples of working fluids of this nature include, but are not limited to, carbon dioxide, nitrous oxide, sulfur hexafluoride, ammonia, xenon, sulfur dioxide, hydrocarbons, and hydrofluorocarbons. According to one embodiment, the working fluid in the circuit is carbon dioxide which is maintained in a supercritical state throughout the working fluid circuit (see FIG. 3).

Mass Management System

During steady-state operation of high-density power generation systems, it may be necessary to increase or decrease power output. Conventional high-density power generation systems accomplish this in a few ways. The first, and obvious way, is to reduce the heat being transferred into the system at the heat source itself. Controlling via this method may result in slower response times. Moreover, for open-loop waste heat recovery systems, the excess waste energy is lost for good. And returning the power generation system to normal operation may be slowed as well because the heat exchangers have cooled.

For these reasons, system designers may want to control power output from within the power generation system itself (rather than from the heat source). One way to accomplish this is with a pressure reducing valve generally located upstream of the system expanders(s). By restricting flow, the power output of the system is reduced. Opening the throttle valve, by comparison, normalizes the flow and restores power generation. The problem with pressure throttling valves is that overall system efficiency is reduced because of the high pressure drop across the valve. Higher temperatures coming out of the expanders, as a result of pressure decrease, lead to the need for higher heat rated expanders, which are more expensive. Along those same lines, throttle valves may cause a faster change in the temperature, which could strain components. Another drawback of throttling valves is that heat is still being put into the system without it being sufficiently used.

For the above reasons, most conventional systems utilize a mass management/control system, where mass is added or removed as needed. This has the added benefit of having a higher part-load efficiency. U.S. Pat. No. 8,613,195 to Held is instructive on this point. Mass is injected into the system by way of valve 15 in Held. Mass addition systems are placed upstream of the compressors or pumps. One of ordinary skill in the art of power generation design would recognize that mass injection before the pump or compressor inlets makes it easier to control the pump/compressor inlet conditions, which in turn prevents pump cavitation and compressor stall. Pressure and mass flow control at the compressor inlet also makes it easier to drive toward an optimum cycle pressure ratio and power modulation. Mass injection at this location means the pressure of the working fluid coming into the system is lower, which reduces the cost of the mass addition system. In conventional power systems, the working fluid could be in a liquid state at this location, which would also ease the control system. Conventional practice of the art teaches that mass control systems at the exit of the pump or compressor system are not preferred because they need higher pressure rated equipment and are more costly.

One limitation with the mass management system of conventional systems is that it slows the cold start time of the overall system. This is because addition of working fluid mass at the pump or compressor system inlet causes the expander to be back-pressured, thereby reducing the power output; also, more work is required in the pump or compressor system further reducing the power output. The time required to accelerate the system to a higher power output is increased since the working fluid must first be compressed before entering the waste heat recovery heat exchanger and then expanding through the expander. Also, when decreasing the power output, mass management systems need to cool the extracted working fluid prior to returning it to the working fluid reservoir, which can take time.

According to the present disclosure, there is presented a novel feature designed to improve start times of a high-density power generation system, as well as more quickly react to fluctuating power requirements. Temperature control valve 26, in combination with cooler 24, regulates the temperature of the working fluid, and inherently its density, at the inlet of low-pressure compressor 10L. Likewise, inter-stage temperature control valve 28, with intercooler 12, regulates the temperature of the working fluid and its density at the inlet of high-pressure compressor 10H. Controlling inlet temperature (and indirectly the density and pressure via the working fluid equation of state) makes it easier to ensure the working fluid remains in the supercritical state as compared to conventional systems, which themselves often drop the working fluid into a liquid state. Temperature control valves 26 and 28, therefore, in combination with a control system and instrumentation discussed later, maintain working fluid of the system outside of a liquid state. This, in turn also eliminates the need for a condenser and pump system. And it controls the mass flow entering the compressors without having to rely on a mass-addition valve at the compressor inlet.

A stall margin or back-pressure control valve 34 is added to provide direct stall margin control of the compressor system and to provide an expander bypass when the system power output is decreased quickly. Moreover, controlling for temperature at the inlet of both compressors (by way of the temperature valves and cooler/intercooler), the present embodiment maximizes the heat that can be removed from the waste heat source.

Mass must still be added or removed from the system disclosed herein, for example to compensate for leakages, but according to the exemplary embodiment presented, this is accomplished by way of a mass management system located after the compressors. One of ordinary skill in the art would understand that a mass management system has the primary purpose of adding and removing mass from the system and may contain component to that end, including but not limited to a working fluid storage vessel, pump, heater(s), valve(s), and pressure and temperature instrumentation and control system. Pressure control valve 14 and backpressure control valve 15, as represented in FIG. 1, add mass to the system and take it away, respectively.

In the embodiment shown, they are located in between compressor 10H and waste heat exchanger 16. The location of said pressure control valves 14 and 15, as shown in the embodiment represented in FIG. 1, improves start times of the power generation system in several ways. Mass addition prior to waste heat exchanger 16 and expanders 18 and 22 assists the expanders in power generation because valves 14 and 15, by way of a control system in combination with temperature control valves 26 and 28, can better keep the working fluid at or near the maximum allowable operating pressure. The maximum allowable operating pressure is a limit set, usually by a regulatory body, which applies to compressed gas pressure vessels. A higher pressure at the inlet of the expanders improves power generation. During start up, conventional systems struggle with mass addition because the working fluid must first be pumped and compressed before entering the waste heat recovery heat exchanger and then expanded through the expander. This reduces the power output from the conventional system (which, during startup, increases the time to bootstrap). By contrast, the placement of valves 14 and 15, according to the present design, counter this limitation because injected working fluid imparts less of a load on the compressor(s), thereby reducing the work required to be transferred into the system at startup.

Another benefit of the design herein presented is that more accurately targeting the maximum allowable pressure allows for smaller heat exchangers. Well understood in the industry is the pressure drop of a system due to pipe friction. Pressure drop reduces efficiency of the overall system, so designers combat pressure drop by designing for larger heat exchangers to reduce friction. But larger heat exchangers cost more (because they contain more raw materials) and take longer to achieve normal operating temperatures. According to the disclosure presented herein, it is an object of the present design to lower cost and reduce start up times. By optimizing for pressure in front of waste heat exchanger 16 and cascade heat exchanger 20, the embodiment shown in FIG. 1 mitigates pressure drop with the use of smaller heat exchangers. This allows the mass of the heat exchanger material as well as fluid inventory within the heat exchanger to be reduced, leading to a heat exchanger that can more quickly respond to changes in energy input.

An additional benefit to the configuration as shown in FIG. 1 is that the system can more quickly control for saturation curve margin. The saturation curve is the curve on a T-s or P-h diagram that separates the two-phase region from the region that are liquid or vapor. If the compressor is allowed operate with total pressure and temperature conditions to close to the saturation curve, then acceleration of flow at the inlet of the compressor may cause the flow to enter the two-phase region inside the saturation curve. This leads to erosion of the compressor and possible mechanical damage.

Referring to the P-H diagram in FIG. 3 state "A". The state of the working fluid at the inlet can be controlled within "saturation curve margin" by varying pressure through a mass addition system, or by controlling temperature as is done in the presently disclosed embodiment. Temperature variance is faster and provides better control than a mass-add system at the compressor inlet. Increasing the temperature moves point "A" away from the saturation curve.

If mass is added at the inlet, the fluid pressure increases but the temperature decreases (the mass-add temperature decreases as it expands through a valve.) If the pressure drop across the mass-addition valve is high, fluid temperature may drop below the saturation line. The system must then add heat at the compressor inlet to re-establish supercritical or vapor at that location. Having the mass-addition system after the compressor eliminates this problem.

If a cycle has liquid fluid at the pump inlet, like conventional systems, the mass-add system can be used at the pump inlet without having to worry about two-phase flow. The fluid at the pump inlet is liquid and it stays liquid when mass is added.

There are inherent problems with systems that experience two-phase flow of a liquid and vapor in a system. Liquid fluid droplets impacting wetted surfaces lead to erosion and mechanical damage to compressor, turbine, heat exchangers, valves and other system components. Liquid droplets impinging on temperature, pressure, and mass flow instruments introduce errors and uncertainties in fluid state measurements. Another problem with two-phase flow is that is very difficult to measure the mass flow rate of the working fluid because the quality (or ratio of vapor to liquid) is not known.

To address and overcome these problems, the present invention described herein, uses low-pressure compressor 10L and the high-pressure compressor 10H that are designed to operate with the working fluid in supercritical or gaseous or vapor states. The invention includes pressure and temperature measurement devices (not shown) at the compressor inlets. A digital control system monitors the working fluid temperature and pressure, determines the fluid state, and modulates temperature control valves 26 and 28, in conjunction with the mass management control valves 14 and 15, to establish the desired state at the low-pressure and high-pressure compressor inlets. The control system maintains temperature and pressure state above the saturation curve with enough margin to account for instrumentation measurement errors, system startup and shutdown transient operation, and natural changes in fluid state as it passes through system components and devices. This margin to the saturation curve is beneficial because it prevents erosion and possible mechanical damage of the compressor, turbine or heat exchangers caused by flowing of a two-phase fluid. It is also beneficial because it is easier to measure the mass flow rate of the working fluid when it is in the supercritical, vapor, and gaseous states.

Synchronous Generator

For power generation systems having the end product being electricity, two types of generators are used—synchronous and asynchronous. Conventional utility scale steam and gas turbines, for example, generally employ synchronous generators because they supply constant voltage and constant frequency, and they have the capability to deliver active as well as reactive power. Steam and gas turbines can easily utilize synchronous generators because they can operate under lower densities (higher volumetric flows and flow areas) and vary the size of the mechanical components or the number of turbine and compressor stages in order to match the speed of the synchronous generator (which itself is constrained by its connection to the electrical grid).

Power generation systems having supercritical working fluid, however, encounter problems in using synchronous generators. Supercritical systems, by way of their higher fluid densities, employ smaller turbines and compressors running at higher speeds than gas turbines or steam turbines of equivalent power rating. This results in difficulty in connecting the turbines (and compressors) of supercritical systems to a synchronous generator because the rotating components are running at different speeds. Conventional supercritical power generation systems generating less than 100 megawatt electric, therefore, use special asynchronous generators. Asynchronous generators do not need to be synchronized with the frequency of the grid. Instead, this is done with electronics. Asynchronous generators are more complex, more difficult to repair, and more expensive. Electrical power generation systems that use asynchronous generators require special electrical transformation devices to convert the frequency, voltage, and phasing to match the electrical grid. There is, therefore, a desire to use synchronous generators with a supercritical power generation system.

One way to handle the rotational velocity difference is to use a free-power turbine connected directly to the generator but not connected to the compressor. A separate drive turbine is used to drive the compressor. Flow in the system is split between the free-power turbine and the drive turbine. As would be apparent to one of ordinary skill in the art, this solution is more complex and costly because an additional working fluid loop is required, as is a secondary turbine.

Another way to deal with the speed difference inherent in supercritical systems is through the use of a gear component. But with conventional supercritical power generation systems, a gear solution presents additional problems. For example, if a radial turbine is connected to the generator through the gearbox and is rotated by the generator during a system start-up, flow can develop through the radial turbine rotor in the wrong direction and if the generator is not used to rotate the radial turbine, then the turbine will struggle to produce enough torque during start-up to accelerate the generator quickly. Some systems may use a gearbox to get the speed of the turbine down to the generator speed, but they run into limitations because of the single stage of compression. A single stage compressor for many supercritical fluids such as Carbon Dioxide, Nitrous Oxide, and Ammonia is limited in the pressure ratio that can be developed across the compressor. For higher pressure ratio supercritical systems, the compressor can be split into multiple stages, however due to the change in density through the compressor, multiple stages at a single speed will not be as efficient as multiple stages at differing speeds. However, even with differing speeds it is desirable to control the density entering the compressors in order to maintain optimum efficiency.

Disclosed herein is a power generation system having a two-stage compressor system connected to a gearbox, allowing the compressors to run at different speeds during steady state operations. In addition, according to the exemplary embodiment disclosed, axial turbines are employed as expanders 18 and 22. As will be appreciated from the discussion below, this configuration presents numerous benefits, including but not limited to optimized compressor and turbine operating speeds, flow in the correct direction during start-up without the need for special valving or procedures, the use of a conventional synchronous generator by which the system may be started, low gear pitch line velocities, and low turbine thermal stress during transient conditions.

Conventional waste heat recovery power generation systems employing axial turbines connected to the pinion shaft of a gearbox orient the inlet of the axial turbine on the side of the gearbox. These configurations have a large turbine inlet volute casing mounted to the gearbox casing structure. The inlet volute is needed to quickly turn the inlet flow from a radial to an axial direction. This arrangement allows the turbine to be removed from the casing without removing the inlet volute. However, this type of arrangement presents problems because of the temperature gradients and stresses between the turbine inlet and the gearbox casing. For example, additional cooling and insulation is needed for thermal protection of the gearbox bearings and seals, special structure or additional support is necessary to carry the thermal stress loads, additional gearbox structure is needed to carry the weight of the turbine inlet volute, a large flanged connection is needed at the turbine exit to facilitate installation and removal of the turbine components.

The present invention described herein, resolves these issues by orienting the inlet of the axial turbine away from the gearbox. See FIG. 2 flow direction arrow associated with expander 18 and 22. Working fluid enters the expander through an inlet located on the distal end of pinion shaft 100 or 106 and flows toward the gearbox. In this orientation the cooler and lower pressure working fluid exiting the axial turbine is on the side of the gearbox. As a result, the gearbox bearings and seals require less thermal protection, the thermal stress loads are reduced, and a lighter radial pipe exhaust duct is used in place of a heavier inlet volute. This orientation locates the axial turbine torque carrier tube-to-pinion shaft connection in the cooler exhaust portion of the turbine, and it provides axial flow into the axial turbine inlet.

According to one embodiment, there is disclosed a power generation system wherein a synchronous generator 108 is mechanically coupled to a compressor (for example compressors 10L and 10H) and an expander (for example expander 18 and 22). During normal operation, also known as steady state, when generator 108 is synchronized with the electrical grid, the rotational speeds of the generator, compressor(s), and turbine(s) are held constant. One of ordinary skill in the art would recognize that "constant" as used herein, means not varying to a large degree.

FIG. 2 shows an exemplary embodiment. Primary expander 18, which in this embodiment is an axial turbine, is mechanically rotationally connected to high-speed compressor 10H by way of high-speed pinion shaft 106. Cascade expander 22, which is also an axial turbine, is mechanically rotationally connected to low-speed compressor 10L by way of low speed pinion shaft 100. Low-speed pinion shaft 100 is rotationally connected to high-speed pinion shaft by way of a gear mechanism, such as the bull gear 104 shown in FIG. 2. Generator 108 is mechanically rotationally connected to the aforementioned components through flexible coupling 114 and a torque transmitting connection such as a keyway, plurality of bolts, or splined shaft.

According to the present embodiment, each bank of turbine/compressors run at different speeds, though they are constant at steady state operations of the power generation system. One of skill in the art would recognize that the high-pressure compressor and primary expander are the two highest powered components. Having those on the same shaft reduces the amount of power that has to be transmitted through the gears. For power generation systems in the 10 to 50 megawatts range, such as disclosed herein, this design maintains pitch-line velocity within the manufacturing limits of a typical gear shaft. The pitch-line velocity being the velocity of the contact point between the pinion and gear in a gear system is controlled by both the rotation speed of the pinion and the power that is transmitted through pinion and gear. The pitch-line velocity is the main limiting factor in high speed gearboxes. When the turbine and compressor are placed on the same shaft, the compressor consumes some of the work of the turbine and less power is transmitted through pinion to gear interface than would be transmitted if the turbine and compressor were on separate pinions. By splitting the system work among multiple turbine and compressor pairs, the pitch-line velocity may be maintained within current manufacturing and material limitations. In one embodiment, the primary expander provides on the order of 14 megawatts of power to the system but the net power transmitted by the pinion shaft to the gear is less than 10 megawatts resulting in a pitch-line velocity well below 150 meters/second, which is the industry high speed limit. Therefore, the embodiment disclosed herein is able to maximize power without exceeding industry pitch-line velocity limits. The system as disclosed in one embodiment is capable of producing between 10 and 50 megawatts of net power.

Alternative designs are herein contemplated. For example, in one embodiment, low-pressure expander 10L is on a third shaft, connected through a third pinion to bull gear 104, wherein it is operating on a separate shaft at a different speed to the other expanders.

In one embodiment, the herein disclosed power generation system includes an inter-stage cooler 12 between low-pressure compressor 10L and high-pressure compressor 10H. Inter-stage cooler 12 allows the compressor inlet of high-pressure compressor 10H to be maintained near the optimum density and therefore maintain flow velocities within a preferred range even as the temperature exiting low-pressure compressor 10L increases. Inter-stage cooler 12 and inter-stage cooler bypass valve 28 allow the temperature of the fluid entering high-pressure compressor 10H to be varied as desired. Without inter-stage cooling, there would be a performance mismatch between the compressors if the compressors were maintained at constant speed, and the temperature entering low-pressure compressor 10L increases. In other words, the overall compressor efficiency decreases, which causes the cycle to lose power.

One of skill in the art of power generation design would appreciate the benefits of the herein disclosed design. Some of the benefits of the design include a supercritical cycle with fast starting capability, high pressure ratio, and high-power transmission with a high reliability gear to a standard generator synchronized to the electrical grid.

Cascade Heat Exchanger

Conventional supercritical power cycles use a recuperator to recover heat from the cycle fluid. The typical recuperator, a special purpose counter-flow energy recovery heat exchanger, is positioned to extract heat from within the system, such as from the waste heat of an expander/turbine. That heat is used to increase the temperature of the working fluid at the inlet to the power generation heat source, such as the primary heat exchanger. The purpose of heating the working fluid in advance of the power generation heat source is to present the hottest fluid to the primary heat exchanger so that the power generation system siphons off the least amount of heat needed to generate the required power. That makes the overall system (inclusive of the heat source) more efficient. But it is only really beneficial for, as an example, recirculating heat sources. Waste heat sources are different because, by definition, the waste heat is lost after interacting with a waste heat power generation system.

Presenting a higher temperature working fluid to the power generation heat source exchanger results in less heat being extracted from that heat source. That may be acceptable for conventional heat sources, but it is disadvantageous for waste heat energy recovery. Waste heat, by its definition, is heat that is being discarded or removed by external means, often by contact with air or water. Waste heat is not recirculated, so there is need to remove as much as possible. Conventional power generation systems, while still employing recuperators, embed larger primary heat exchangers for this purpose. But those larger heat exchangers increase cost (by way of more material) and increase start times because the heat exchangers take longer to come to operating temperatures. There exists a need, therefore, for a power generation system design having faster start times and lower cost.

Disclosed herein is a novel configuration for a power generation system that foregoes the recuperator in preference of cascade heat exchanger 20. Cascade heat exchanger 20 takes excess heat from primary expander 18 for presentation to cascade expander 22. This results in a lower temperature working fluid at the inlet to waste heat exchanger 16, thereby allowing more waste heat to be extracted from the waste heat source.

In the embodiment shown in FIG. 1, cascade heat exchanger 20 is employed in combination with inter-stage cooler 12. Intercooler 12 draws down the temperature of the working fluid between low-pressure compressor 10L and high-pressure compressor 10H. This allows the compressor to operate more efficiently, achieve more compression, and inject high-pressure working fluid at a lower temperature at high-pressure compressor 10H outlet. It follows, therefore, that working fluid M1 also has a lower temperature upon encountering waste heat exchanger 16. Presentation of a lower temperature working fluid to the waste heat source maximizes energy extraction as compared with a conventional high-density power generation system. It also allows the working fluid to absorb heat more quickly with a smaller size heat waste heat exchanger 16, which as discussed earlier, lowers cost and improves cold start times.

As presented in the exemplary embodiment, inter-stage cooler 12 and cascade heat exchanger 20 (for example, by way of a lack of recuperator) work together to lower working fluid M1 temperature at the inlet of waste heat exchanger 16, while still maximizing of the overall system by way of capturing excess heat of primary expander 18 for use in driving cascade expander 22.

System Start Up

Power plant startup often presents a complicated and lengthy process. The typical startup comprises fluid components and circuits that are separated, or isolated, within the system. During startup, fluid components and circuits are sequentially and slowly opened and allowed to reach thermal equilibrium before opening the next component or circuit.

Conventional combined-cycle power generation plants, by their nature, employ a complex startup process, requiring a number of additional costly components and lengthy procedures. An exemplary conventional combined-cycle power plant, for example comprises a turning motor for initiating rotation of the turbine. Separate motors are needed to drive the pumps at startup. For conventional systems in the megawatt range, these motors could be of the 100+ horsepower variety. Condensation is a big problem at startup for conventional power generation systems. For this reason, they need condensation drain systems and vacuum pumps on the condenser. They also need a secondary valve system containing multiple valves to preheat the system in order to avoid condensation and to put steam into the system to start driving the turbine. For steam-based turbines, chemical treatment systems are used to reduce corrosion.

During startup, conventional systems must first heat up metal components above the condensation temperature for the given pressure of the working fluid. Excess condensate must be drained out of the system during the pipe heating process. The external motor is brought online to get the turbine rotating. A separate startup throttle valve is engaged to add steam to the turbine and pressure is slowly ramped up for condensation prevention purposes. Depending on the size of the conventional power plan, the startup process can take between one and seventy-two hours to reach steady state operation.

Organic Rankine cycle systems encounter a number of similar issues. Though some of the aforementioned limitations are not present with organic Rankine cycle generation systems, they come with their own set of issues. Though not specifically discussed herein, one of ordinary skill in the art would recognize such limitations. By way of one example, these systems require heat transfer oil systems, which require separate heat exchangers, pumps, and in many cases a separate recuperator.

Conventional waste heat recovery systems that use high-density or supercritical working fluid solve a number of these startup problems, but encounter other issues. For example, of the components listed above, supercritical systems may only need a startup throttle valve and separate motors to drive the pumps at startup. They also may have a motor to spin up the turbine. But these systems introduce new startup limitations.

Waste heat recovery systems using supercritical working fluid employ a bypass loop around the turbine(s) to prevent fluid from flowing backward. Mechanically and dimensionally a centrifugal compressor and a radial turbine look the same. The turbine exit looks like a compressor inlet. When the turbine is rotated in a static fluid the turbine acts like a compressor and the blade curvature at the exit forces the flow in the wrong direction (fluid flow from turbine exit to entrance). For this reason, these systems isolate the turbine(s) by way of bypass flow circuits and use motors to establish flow in the correct direction within their compressor system. In an alternative startup process, they utilize an additional mass addition system at the turbine inlet to assist in proper working fluid flow direction.

Because they use recuperators, they need additional heaters to bring the recuperator up to operating temperatures. Other heaters are used, for example, to increase the temperature of the working fluid in the isolated turbine section. This minimizes thermal shock on the turbine system during startup. Conventional supercritical systems have to slowly heat up the working fluid before introducing it to the turbine. After the cycle absorbs enough heat and all components and circuits are open, the system "boot-straps" the starting process. The starting method also requires the working fluid to be pumped from the exit of the conventional power generation system condenser to the turbine inlet, which requires a separate starter pump.

As can be appreciated, the startup process for power generation systems known in the art takes time, typically ranging from 60 to 120 minutes. In addition, the inclusion of, for example, the startup mass addition system, the recuperator, and electrical transformation system for the asynchronous generator increases the size of the power plant, increases the complexity, and raises the cost. Consequently, there is a need for a compact, high wattage power generation system that can come online in a shorter timeframe.

Disclosed herein is a novel design for a high-density power generation system with startup times on the order of ten to fifteen minutes. In the embodiment shown, the generator, compressors, and expanders are mechanically coupled by common shaft or bull gear such that generator 108 starts the system. The system operation is initiated by rotating generator 108 as an electric motor with use of an appropriate device such as a Load Commutated Inverter ("LCI"). Rotation of generator 108 causes bull gear 104 and therefore by meshing of the gear teeth, high speed pinion 106 and low speed pinion 100 to rotate, thereby circulating working fluid through the system.

According to one embodiment, expanders 18 and 22 are axial turbines. Because of this, the flow is automatically established in the correct direction when the expanders are rotated. This is because axial turbines have a different shape compared with centrifugal compressors or radial turbines. When an axial turbine is rotated in a static fluid, the turbine acts like a compressor and because of the blade shapes, the flow is in the correct direction.

The positioning of pressure control valves 14 and 15 allow for initial pressurization of the working fluid system piping to assist in startup time because pressurized mass is added in front of expander 18 rather than at compressor 10L. In conventional systems, mass is added at the inlet of the compressor, which slows the compressor because it is suddenly doing more work than the turbine is producing. Conversely, adding mass in front of the turbine speeds it up because it is suddenly producing more power than the compressor is requiring.

The power generation system disclosed herein incorporates systems and methods to further improve startup time. For example, pressure regulation valves 14 and 15 are placed in front of waste heat exchanger 16. This placement, in combination with a control system configured to maintain the maximum operation pressure, improves efficiency for a smaller waste heat exchanger 16. Reduced size, as has been discussed, reduces cost and improves start up time because exchanger components reach their optimum operational temperatures faster. According to the system disclosed herein, no bypass valves are needed at startup. Because the supercritical working fluid flows through all the components, the system comes up to operating temperatures and pressures very quickly. This reduces the start time and reduces thermal cyclic stress induced during startup operation. Establishment of the flow through the system in the correct direction, because of the axial turbines herein disclosed, uniformly heats the system to operational temperatures, which assists in fast startup times. Conventional systems, as described above, start up with sections isolated for the purpose of, among other things, establishing flow in the correct direction.

According to one embodiment, a control system monitors generator 108 shaft speed continuously. When primary and cascade expanders 18 and 22 accelerate the generator to the correct speed, the LCI is disengaged. During startup, the generator is rotated using the LCI to about 50% of synchronous speed. The generator rotates the compressor system and the expanders which cause working fluid flow through all system components. When the working fluid absorbs enough heat from the waste heat exchanger, and the fluid temperature, pressure and density reach the proper state, the expanders will generate enough torque to accelerate the generator. At approximately 75% of synchronous speed, the LCI will cutoff and the expanders will continue to accelerate the generator.

As should be appreciated, the design disclosed herein, along with the methods discussed, dramatically reduce startup times. In addition, the power generation system disclosed herein encapsulates a smaller footprint such that, according to one embodiment, a 10-15 megawatt system can be trailer mounted. The smaller footprint is achieved because fewer requirements are needed for startup, and because the sizes of certain components are reduced.

Controls and Instrumentation

Conventional power generation systems and power plants consist of multiple systems and sub-systems that are interconnected fluidly, mechanically, and/or electrically. These power generation systems/plants use state-of-art Distributed Control Systems (DCS) to safely and efficiently operate the plant, systems, and sub-systems. The DCS uses integrated programmable logic controls (PLC's) (which, one skilled in the art would recognize to include a microprocessor for executing control logic and issuing commands to actuated devices and the like), distributed instrumentation packages, valves, switches, and actuator systems to modulate and control the plant. The switches and actuator systems may be electric, pneumatic, or hydraulic in nature. Conventional waste heat recovery systems use a similar instrumentation and control system configuration to allow safe and effective control of the waste heat recovery power generation system and to integrate with the power plant DCS.

Within this detailed description, certain references have been made to control of various components within the disclosed power generation systems, such as valves, compressors, and expanders. A person of skill in the art of high-density power systems would understand basic control system operation and logic. However, a brief description of generalized control of an exemplary embodiment of the present invention is contained below for purposes of reference.

The present invention described herein, uses a similar state-of-art digital and automatic control system comprising a PLC system, distributed instrumentation packages, valves, switches, and actuator systems to modulate and control the system and its components. This control system interfaces with existing power plant DCS and takes appropriate actions during a system or plant upset. In addition, this control system must startup, synchronize with the electrical power grid, maintain power, shutdown, and provide safe operation. The automatic control system provides instrumentation packages (e.g., pressure, temperature, speed and flow sensors), controller sequencing, system and sub-system regulators, input/output and reporting operations, working fluid mass control, plant DCS integration, and Human Machine Interfaces (HMI). The control system software contains the appropriate physics-based models, thermodynamic equations of state, turbomachinery operating maps, proportional-integral-derivative (PID) regulator logic blocks, sub-system/controller sequencing, fault accommodation, sub-system operating schedules, and reporting systems that are needed to control the system. Instrumentation packages, that measure working fluid state variables of pressure, temperature, and mass flow, are located at the inlet and exit of each flow control valve and each system component.

The following instrumentation packages and control actuator systems are used to ensure safe and proper operation of the waste heat recovery power generation system. A person of skill in the art would recognize that various sensors known in the industry could be used, such as pressure transmitters, thermocouples, resistance temperature devices, Coriolis flow meters, linear variable differential transmitters, vibration sensors, magnetic detectors, rotational speed sensors, proximity probes, and equivalents. According to embodiments disclosed herein, the following control mechanisms are contemplated. The control measures the working fluid pressures and temperatures at the inlet and exit of temperature mixing valve 26. The control modulates the temperature mixing valve 26 position to set the desired inlet conditions to low-pressure compressor 10L. The control measures the working fluid pressures and temperatures at the inlet and exit of temperature mixing valve 28. The control modulates temperature mixing valve 28 position to set the desired inlet conditions to low-pressure compressor 10H. The control measures the working fluid pressure, temperature, and mass flow at the exit of high-pressure compressor 10H. The control also measures the system mass flow after the mass-out valve 15. The control then modulates mass-add valve 14 or mass-out valve 15 as required to set the desired mass and mass flow rate in the system. The control measures the pressure ratios across low-pressure and high-pressure compressors 10L and 10H. The control modulates flow control valve 34 to maintain the desired compressor stall margins. The control measures the pressure, temperature and working fluid flow rate at the inlet of the primary waste heat recovery exchanger. The control modulates flow valve 32 to control primary expander 18 power output or isolate waste heat recovery exchanger 16. Flow valve 32, according to an embodiment of the present system, is configured to modulate working fluid through primary waste heat exchanger 16, which can assist, for example, in regulating emissions during startup, among other things. In addition, it can be used to isolate the waste heat recovery cycle from the heat source without affecting the heat source operation.

The control measures the pressure, temperature, and working fluid flow rate at the inlet of primary expander 16. The control modulates flow valve 30 to bypass primary expander 16 and control the power output. The control also measures the rotational speeds of all shafts using speed sensors in gearbox 102, power output of generator 108, and expander lateral vibrations.

The system is configured and arranged so that the control can set the generator to rotate at a synchronous speed while the compressors and expanders rotate at different speeds that are optimum for power generation. In this arrangement, the system modulates power as needed by controlling the heat recovery exchanger 16 though valve 32, as well as mass in the system by way of valves 14 and 15 and compressor and expander bypass valve 34, and compressor inlet temperatures through valves 24 and 28. Temperature control valves 26 and 28 operate in conjunction with compressor stall margin and expander bypass control valve 34 along with the mass control valves 14 and 15 to modulate flow through the compressor system and to maintain the desired compressor stall margin. During synchronous operation, the speed of the turbine and compressor are held constant, for example with the electrical grid frequency. The turbine flows, compressor flows, and temperature mixing valve configurations and controls are simplified because power output is controlled rather than both power-output and generator speed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. Certain terms are used throughout the written description and claims to refer to particular components. As one of ordinary skill in the art will readily appreciate from the disclosure of the present invention, various entities may refer to the same component by different names, and as such, the naming convention for the elements described herein is not intended to limit the scope of the disclosure, unless otherwise specifically defined herein. Furthermore, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In the written description and in the claims, the terms "including." "containing," and "comprising" are used in an open-ended fashion, and thus should be interpreted to mean "including, but not limited to." All numerical values in this disclosure may be exact or approximate values unless otherwise specifically stated.

What is claimed is:

1. A supercritical Brayton cycle power generation system comprising:
   at least one compressor for compressing working fluid;
   at least one expander for generating work, wherein the at least one expander is fluidly coupled with the at least one compressor;
   at least one primary heat exchanger for adding heat to the power generation system, wherein the primary heat exchanger is coupled between the at least one compressor and the at least one expander;
   at least one temperature control valve located upstream of the at least one compressor;
   a mass management system located downstream of the at least one compressor, the mass management system comprising a pressure control valve for adding mass to the power generation system and a backpressure control valve for removing mass from the power generation system;
   wherein the at least one temperature control valve is configured to maintain working fluid outside of a liquid state.

2. The system of claim 1, further comprising:
   at least one primary cooler for rejecting heat from the working fluid, wherein the at least one primary cooler is located upstream of the at least one temperature control valve;
   at least one stall margin control valve configured to control the stall margin of the at least one compressor;
   at least one bypass valve configured to redirect the working fluid around the at least one expander.

3. The system of claim 1, further comprising:
   at least one waste heat flow modulating valve configured to modulate the working fluid flow through the at least one primary heat exchanger.

4. The system of claim 1, wherein the at least one expander is an axial flow turbine.

5. The system of claim 1, wherein the working fluid has a critical temperature less than 200 degrees Celsius.

6. The system of claim 1, wherein the working fluid is supercritical carbon dioxide.

7. The system of claim 1, further comprising:
   a pinion shaft, wherein the at least one expander is rotationally connected to the at least one compressor through the pinion shaft.

8. The system of claim 1,
   wherein the at least one compressor comprises a first compressor and a second compressor for compressing working fluid;
   wherein an inter-stage cooler is positioned downstream of the first compressor and upstream of the second compressor such that working fluid is cooled by way of the inter-stage cooler prior to the inlet of the second compressor;
   wherein the at least one expander comprises a primary expander and a cascade expander for generating work;

wherein a cascade heat exchanger is positioned downstream of the primary expander and upstream of the cascade expander such that excess heat from the primary expander is transferred to the working fluid entering the cascade expander.

9. The system of claim 8,
wherein the at least one temperature control valve includes a temperature control valve located upstream of the first compressor and a temperature control valve located upstream of the second compressor;
wherein the mass management system is located downstream of the first and second compressor;
wherein at least one stall margin control valve is located downstream of the first and second compressor, and is configured to control the stall margin of the first and second compressor.

10. The system of claim 8, further comprising:
at least one waste heat flow modulating valve configured to modulate the working fluid flow through the at least one primary heat exchanger; and
at least one bypass valve configured to redirect the working fluid around the primary expander and cascade expander.

11. The system of claim 8, further comprising:
a first pinion shaft rotationally connecting the cascade expander to the first compressor; and
a second pinion shaft rotationally connecting the primary expander to the second compressor.

12. The system of claim 11,
wherein the cascade expander and first compressor have a first rotational speed, and
wherein the primary expander and second compressor have a second rotational speed, and
wherein the first rotational speed is different than the second rotational speed.

13. The system of claim 12, wherein the first pinion shaft and the second pinion shaft are connected through a bull gear.

14. The system of claim 8, further comprising:
a bypass valve configured to redirect the working fluid around the primary and cascade expander,
wherein the system is configured to be started up by rotation of a generator while the bypass valve is closed.

15. The system of claim 1,
wherein the at least one expander comprises a cascade expander rotationally connected to a first compressor through a first pinion shaft and a primary expander rotationally connected to a second compressor through a second pinion shaft;
wherein the first pinion shaft and second pinion shaft are rotationally connected through a gear; and
wherein a generator is rotationally connected to the first and second pinion shafts.

16. The system of claim 15 wherein, during steady state operations, the cascade expander and first compressor rotate at a first speed, the primary expander and second compressor rotate at a second speed, the generator rotates at a third speed, and wherein all three speeds are constant.

17. The system of claim 15,
wherein the primary and cascade expanders are axial turbines, each turbine having a working fluid inlet location and an outlet location, and
wherein the inlet location is distanced farther from the gear than the outlet location.

18. A supercritical Brayton cycle power generation system comprising:
a compressor configured to compress a working fluid;
an expander fluidly coupled with the compressor, wherein the expander is configured to generate work;
a heat exchanger coupled with the compressor and the expander, wherein the heat exchanger is downstream of the compressor and upstream of the expander, and wherein the heat exchanger is configured to add heat to the working fluid;
a temperature control valve fluidly coupled with the compressor and upstream of the compressor, wherein the at least one temperature control valve is configured to maintain the working fluid outside of a liquid state;
a pressure control valve fluidly coupled with the heat exchanger and downstream of the compressor, wherein the pressure control valve is configured to add working fluid into the system; and
a backpressure control valve fluidly coupled with the heat exchanger and downstream of the compressor, wherein the backpressure control valve is configured to remove working fluid from the system.

19. A supercritical Brayton cycle power generation system comprising:
a first compressor;
a second compressor fluidly coupled with the first compressor and downstream of the first compressor, wherein the first and second compressors are configured to compress a working fluid;
a temperature control valve fluidly coupled with the first and second compressors, wherein the temperature control valve is configured to maintain the working fluid outside of a liquid state;
a waste heat exchanger coupled with the second compressor and downstream of the second compressor;
a pressure control valve fluidly coupled with the waste heat exchanger, wherein the pressure control valve is upstream of the waste heat exchanger and downstream of the first and second compressors, wherein the pressure control valve is configured to supply working fluid into the system;
a backpressure control valve fluidly coupled with the waste heat exchanger, wherein the backpressure control valve is upstream of the waste heat exchanger and downstream of the first and second compressors, wherein the backpressure control valve is configured to remove working fluid from the system;
a primary expander coupled with and downstream of the waste heat exchanger, wherein the primary expander is configured to generate work;
a cascade heat exchanger coupled with and downstream of the primary expander; and
a cascade expander coupled with and downstream of the cascade heat exchanger, wherein the cascade expander is fluidly coupled with the first compressor.

20. The system of claim 19, further comprising:
a first pinion shaft coupled with and between the cascade expander and the first compressor, wherein the cascade expander and first compressor have a first rotational speed;
a second pinion shaft coupled with and between the primary expander to the second compressor, wherein the primary expander and second compressor have a second rotational speed;
wherein the first rotational speed is different than the second rotational speed; and
wherein the first pinion shaft and the second pinion shaft are connected through a gear.

* * * * *